June 25, 1935.  J. E. LOVELY  2,006,144
FEED KNOCK-OFF MECHANISM FOR LATHES
Filed Nov. 3, 1932    5 Sheets-Sheet 4
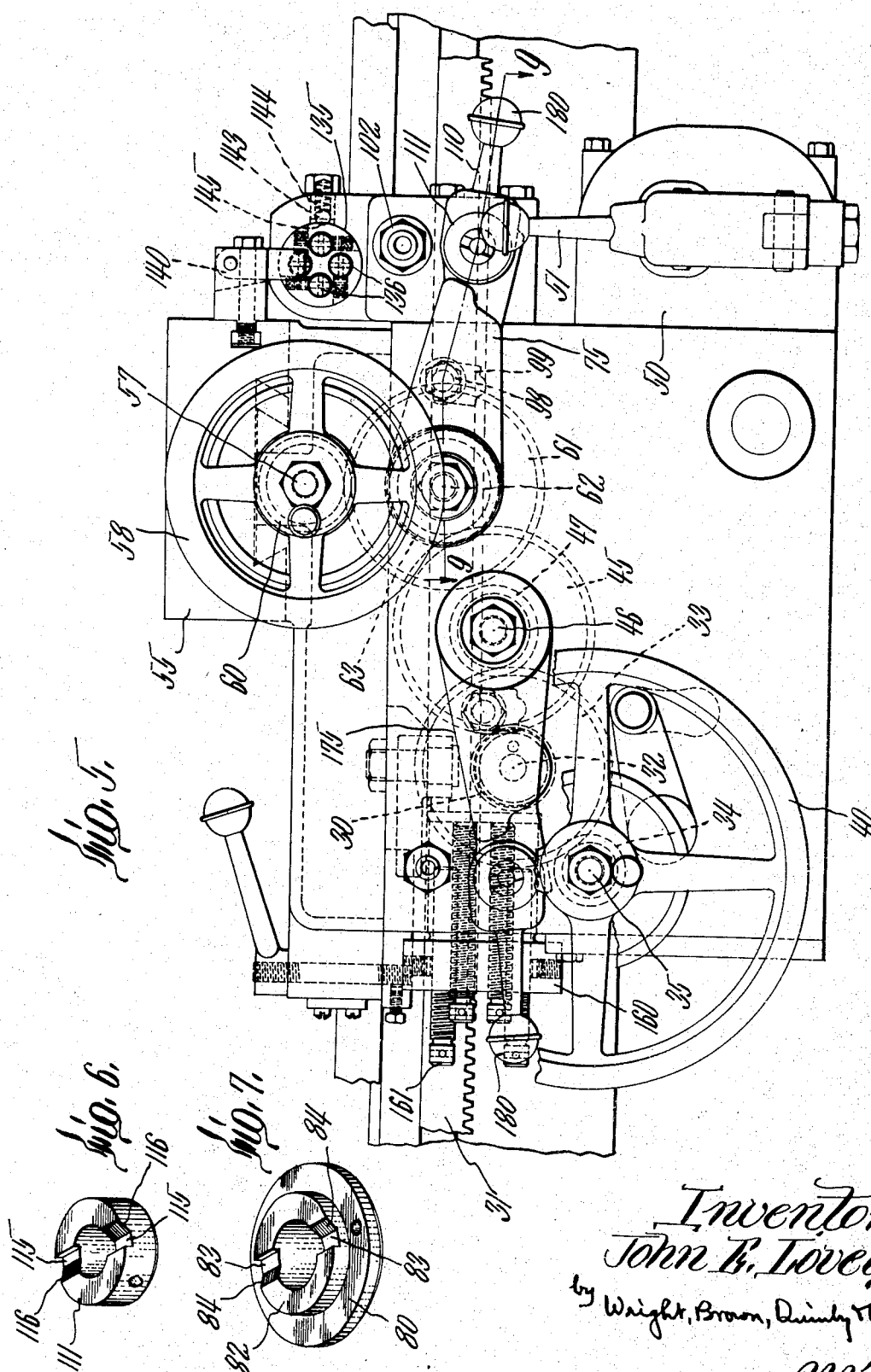
Inventor
John E. Lovely
by Wright, Brown, Quinby & May
Attys

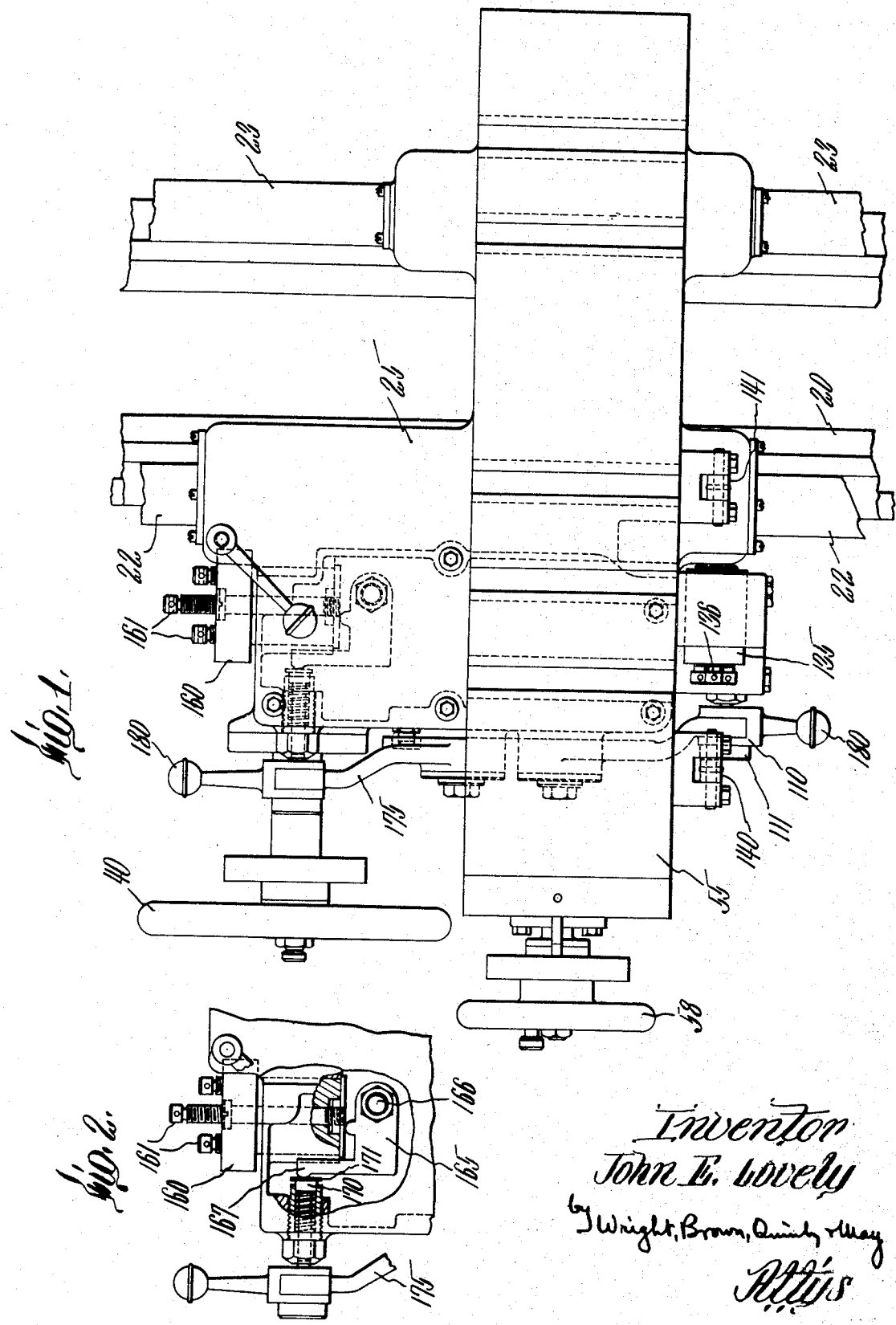

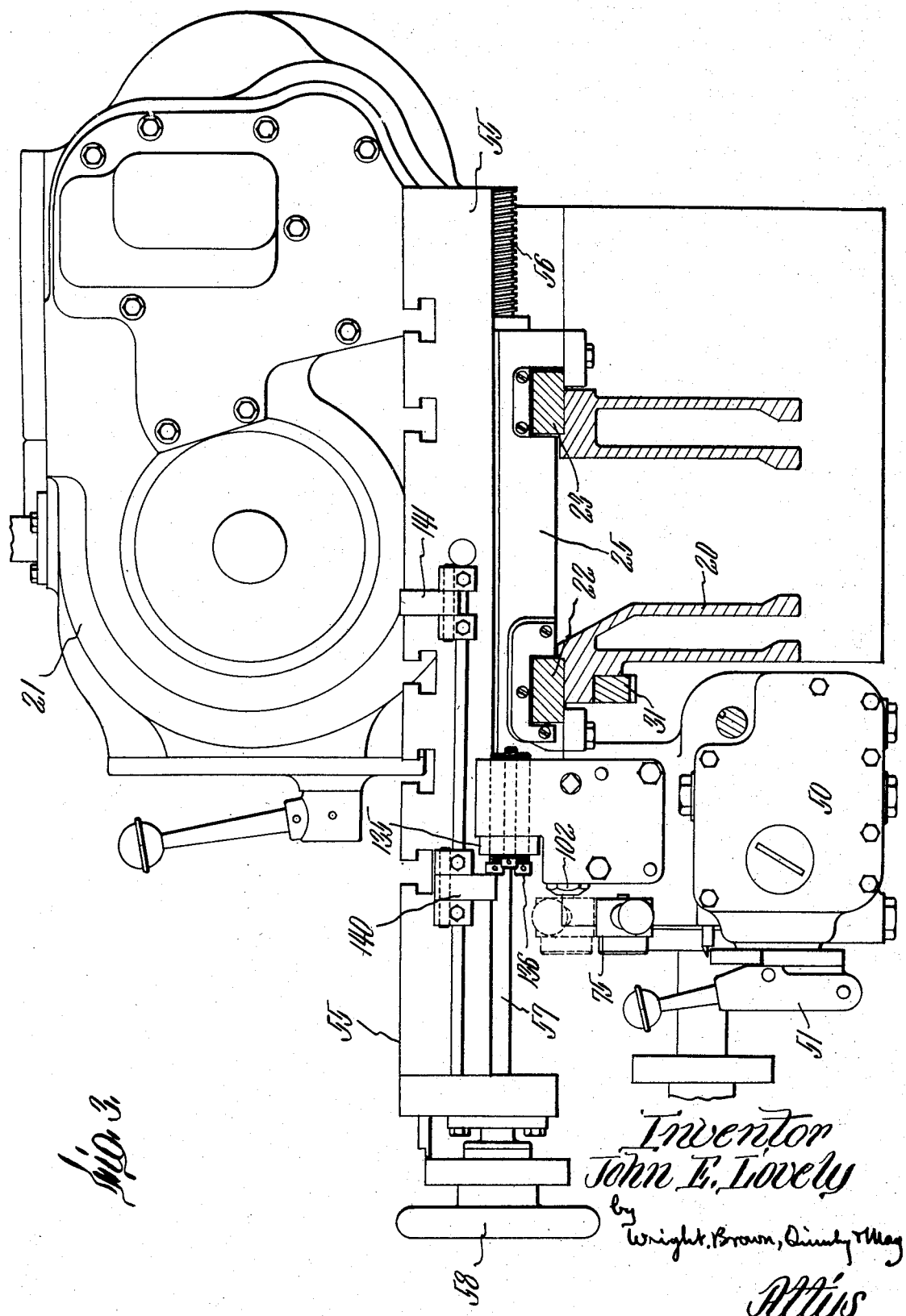

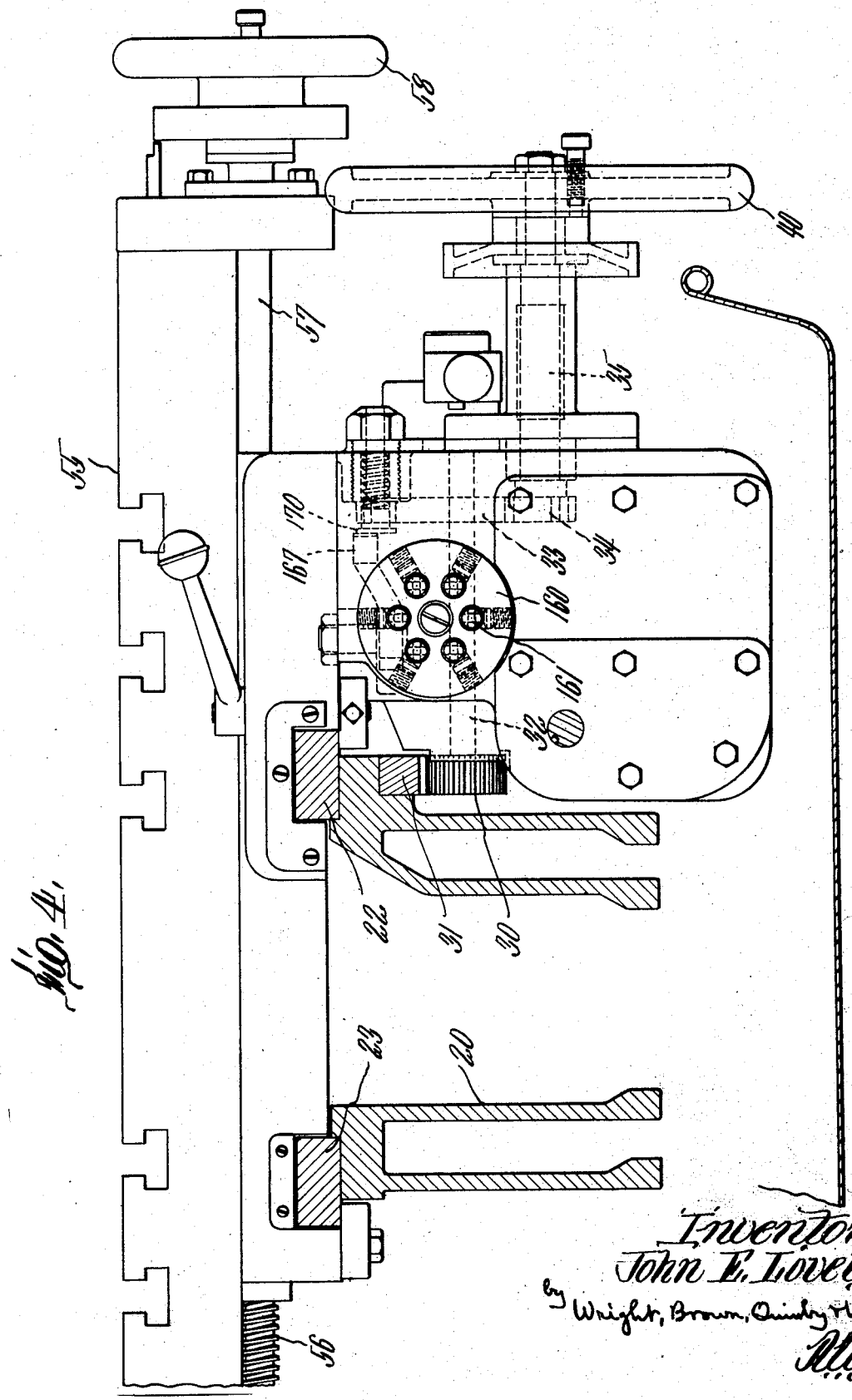

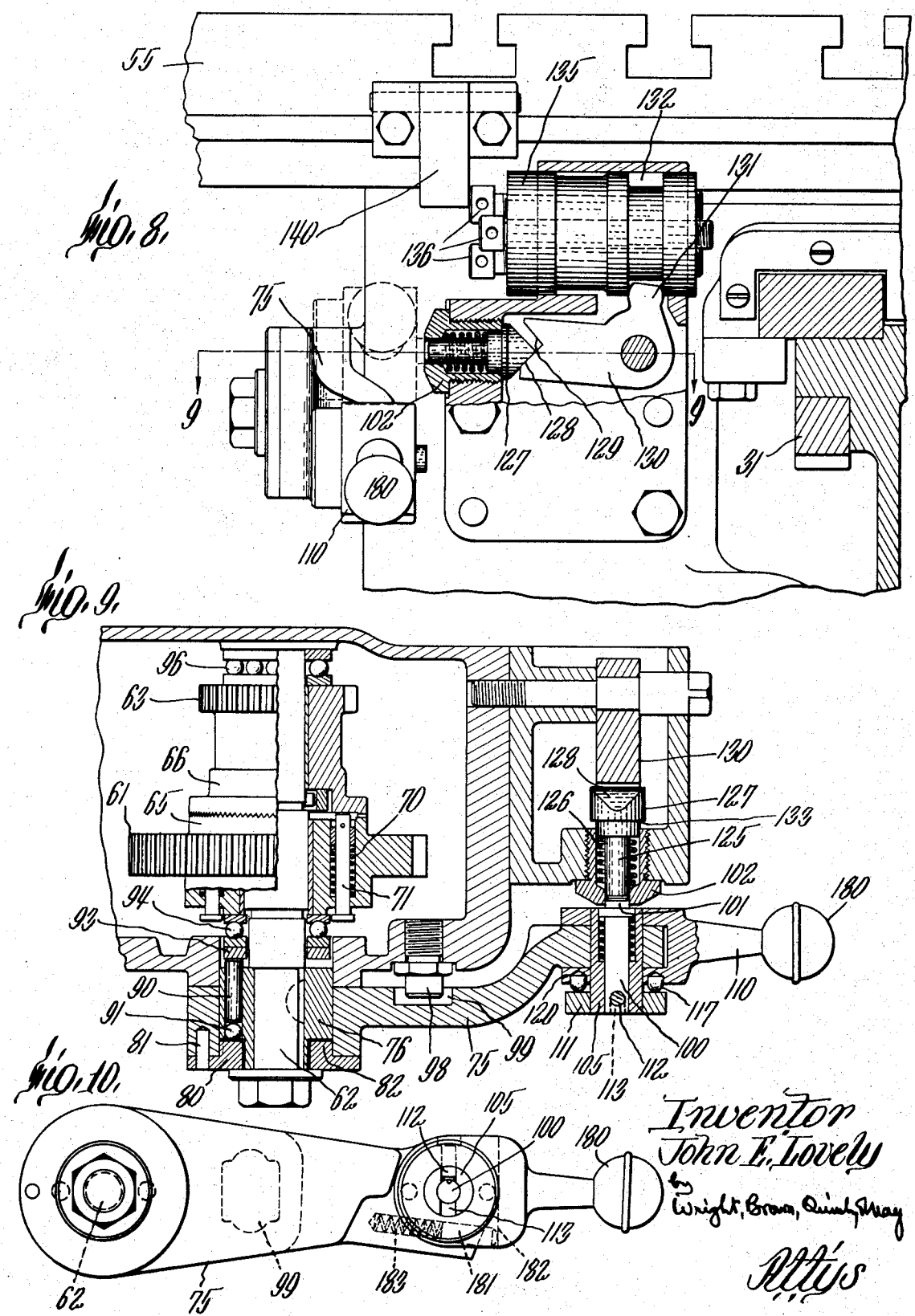

Patented June 25, 1935

2,006,144

UNITED STATES PATENT OFFICE 2,006,144

FEED KNOCK-OFF MECHANISM FOR LATHES

John E. Lovely, Springfield, Vt., assignor to Jones & Lamson Machine Company, Springfield, Vt., a corporation of Vermont Application November 3, 1932, Serial No. 640,927

6 Claims. (Cl. 82—21)

This invention relates to mechanism for knocking off the feed of the carriage and cross-slide of a lathe. In the particular embodiment of the invention illustrated on the drawings, the invention is shown as applied to a lathe having a carriage slidable longitudinally on the lathe bed, a cross-slide being mounted on the carriage and transversely slidable thereon, this slide being provided with grooves for the mounting of a turret or of individual tools.

According to the invention the transverse feed can be knocked off in both directions at selected predetermined points. The longitudinal feed of the carriage toward the chuck can be knocked off at a selected predetermined point. The mechanism also includes means for convenient manual knocking off of either feed at any time. Other advantageous combinations and features of structure will be apparent from the disclosure of the invention in the description which follows and on the drawings, of which,—

Figure 1 is a plan view of a portion of a lathe including an embodiment of the invention.

Figure 2 shows a portion of Figure 1 with a part of the casing broken away to show the parts within.

Figure 3 is a sectional view of the lathe, looking toward the head stock.

Figure 4 is a sectional view of the lathe, looking away from the head stock.

Figure 5 is a front elevation of a portion of the lathe.

Figures 6 and 7 are perspective views of cam elements in the control levers.

Figure 8 shows a portion of Figure 3, with part of the casing broken away to show working parts within.

Figure 9 is a section on the lines 9—9 of Figures 5 and 8, the parts being shown, however, in a different position of operation.

Figure 10 is an elevation of a control lever.

As indicated on Figures 1 and 3 the invention may be embodied in mechanism mounted on a lathe having a bed 20 with a head stock 21 at one end thereof, the bed including a pair of ways 22 and 23 on which is slidably mounted a carriage 25. The carriage may be fed along the ways by rotation of a pinion 30 (Figure 4) which meshes with a rack 31 secured to the bed of the lathe. The pinion 30 is mounted on a suitable shaft 32 which is journalled in a portion of the carriage 25 and which also has thereon a gear wheel 33 meshing with a pinion 34 mounted on a shaft 35. A hand wheel 40 is also mounted on the shaft 35 for manual actuation of the carriage feeding mechanism. The carriage may also be fed by power. A constantly driven gear wheel 45 (Figure 5) is loosely mounted on a shaft 46 which is journalled in the carriage. A pinion 47 is also loosely mounted on the shaft 46 and may be operatively connected with the gear wheel 45 by a clutch as hereinafter described. Any conventional means may be employed for driving the gear wheel 45. Such means may include change speed gearing conveniently located in a casing 50 for operation by a control lever 51, as described in a co-pending application Serial No. 675,887, filed by Ralph E. Flanders on June 15, 1933.

Mounted on the carriage for transverse sliding movement is a cross-slide 55. A feed screw 56 is mounted on the cross-slide to provide transverse feeding movement to the cross-slide in a manner well known in the art. The feed screw has an extension 57 with a hand wheel 58 for manual actuation of the feeding mechanism for the cross-slide. Mounted on the extension 57 of the feed screw is a pinion 60 which meshes with a gear wheel 61. This gear wheel is loosely mounted on a shaft 62 on which is also loosely mounted a pinion 63 meshing with the gear wheel 45 to be constantly driven therewith. The gear wheel 61 and pinion 63 can be operatively connected as by a clutch for transmission of power from the driving means to the feed screw 56. As the clutches for connecting the gear wheel 61 to the pinion 63 and for connecting the pinion 47 to the gear wheel 45 may be of substantially indentical construction, one such clutch is herein illustrated and described. As shown in Figure 9, the clutch may consist of a pair of hub members 65 and 66 integral with or connected to the gear wheel 61 (or the gear wheel 45) and the pinion 63 (or the pinion 47) respectively. These hub members are provided with abutting faces, preferably with interfitting serrations, whereby the gear wheel 61 may be driven with the pinion 63 when these serrated faces are in mutual engagement. The hub member 65, as shown, is provided with a number of springs 70 which press against plungers 71 so as to push the hub member 65 away from the hub member 66. Thus the clutch if left to itself is normally open or disengaged. For the engagement of the clutch, a control lever 75 may be provided, this lever being loosely mounted on a sleeve 76 which is keyed or otherwise secured to the shaft 62. The sleeve 76 is grooved at its outer end to receive loosely a cam ring 80 which is pinned to the hub portion of the lever 75 as by a suitable pin 81 so as to rock therewith around the axis of the shaft 62. The cam ring 80 is provided with an annular portion 82 having a pair of notches 83 therein. Each of these notches has one sloping side face 84. The sleeve 76 is drilled to receive a pair of plungers 90 and balls 91. The latter are adapted to enter the recesses 83 in the cam ring 80. It is evident that when the lever 75 is rocked, if the balls 91 are in the recesses 83, rocking movement of the cam ring 80 will cause the balls 91 to ride on the sloping surfaces 84, thus causing the plungers 90 to move upwardly or toward the gear wheel 61, as shown in Figure 9. The ends of the plungers 90 remote from the balls 91 are adapted to rest against a suitable ring 93 on which is a ball bearing 94. This ball bearing in turn bears against an end face of the hub member 65 of the gear wheel 61. Thus when the plungers 90 are moved toward the gear wheel 61, such movement results in similar movement on the part of the gear wheel itself. The sloping surfaces 84 of the cam member 80 are so designed that when the balls 91 ride out of the recesses 83, the hub member 65 of the gear wheel is moved into operative engagement with the hub member 66 so that the gear wheel 61 is thereupon driven by its connection with the pinion 63. At the further end of the pinion hub member 66, a ball bearing 96 may be provided to take the thrust of the plungers 90 acting against the hub member 65. It is evident that rocking the lever 75 about its axis results in engaging and disengaging the clutch which connects the gear wheel 61 with the pinion 63. The rocking stroke of the lever 75 may be suitably limited by a button 98 projecting into a recess 99 of the lever arm 75, the slot of the recess 99 being of limited length.

Since it is necessary to maintain the clutch engaged for considerable periods of time during the operation of the lathe, it is desirable to have means for locking the control lever 75 in its position for clutch engagement. To this end a latch member 100 is mounted in the end portion of the lever arm 75, the latch member 100 having a projecting portion 101 normally extending into an aperture in the end of a hollow thimble 102 which is secured in suitable position in the carriage frame, the lever arm 75 is held in clutch engaging position as long as the end of the latch 100 is engaged in the opening of the thimble 102. Manually operable means are provided for the retraction of the latch 100 to release the lever arm 75. To this end the latch 100 is slidably mounted in a sleeve 105 which is fixed transversely in the end portion of the lever arm 75 and projects therefrom at both ends. An auxiliary lever 110 is rockably mounted on the sleeve 105, the end portion of the auxiliary lever 110 being forked so as to bear on both projecting end portions of the sleeve 105. One of the end portions of the sleeve 105 projects beyond the lever 110 sufficiently to carry loosely a cam ring 111. This ring is pinned to the latch 100 by a pin 112 which rides in a slot 113 in the sleeve 105 so that the ring is held against rotation relative to the sleeve, but is permitted axial movement with the latch 100. The ring 111, as shown in Figure 6, is provided with two or more notches 115 in its end face, the side wall 116 of each notch being sloped. A pair of pins 117 are driven into recesses in the outer face of the auxiliary lever 118, these pins having rounded ends projecting from the face of the lever to ride in respective notches 115 in the ring. When the lever 110 is rocked with respect to the lever 75, the pins 117 are caused to ride out of their recesses 115. This reacts against the ring 111 moving it downwardly as shown in Figure 9, this downward motion resulting in a retraction of the end portion 101 of the latch 100 from the opening in the thimble 102. Thus the lever 75 is released so as to disengage the clutch members 65 and 66.

The lever 75 may also be released automatically by suitable means illustrated particularly in Figures 8 and 9. Within the thimble 102 is slidably mounted a plunger 125, the end of which normally abuts the end of the latch 100. The plunger 125 is movable outwardly so as to push the latch 100 clear of the opening in the thimble 102, but is usually pressed in the opposite direction by a suitable spring 126. The plunger 125 is provided with a head 127 which may have a double bevel 128 to engage in a notch 129 in an arm of a bell crank 130. The other arm 131 of the bell crank engages in a peripheral groove 132 of a suitable spool 135 which is rotatably adjustable in the carriage. This spool is axially slidable for a short distance to rock the bell crank 130. When the bell crank is thus rocked, as shown in Figure 8, one or the other of the beveled faces 128 of the plunger head 127 rides on one of the faces of the notch 129, the plunger 125 being pushed against the pressure of the spring 126 to move the end portion 101 of the latch 100 clear of the thimble 102. The head 127 is preferably of greater diameter than the rest of the plunger 125 forming a shoulder 133 adapted to engage the inner end of the thimble 102 when the plunger is pushed outwardly by the rocking of the bell crank 130. The outer end of the plunger 125 is preferably flush with the outer end of the thimble 102 when the shoulder 133 is pressed against the inner end of the thimble, as shown in Figure 8. Thus axial movement of the spool 135 in either direction releases the lever 75 so as to throw out the clutch and stop the rotation of the feed screw 56, and the engagement of the shoulder 133 with the inner end of the thimble 102 provides definite positive stops for the cross-slide at predetermined points. The spool 135 is preferably provided with a plurality of set screws 136 these set screws extending all the way through the spool parallel with the axis thereof. Four such screws are illustrated in the spool 135 as shown in Figure 5. The cross-slide 55 is provided with a pair of stop elements 140 and 141. These elements can be swung into or out of operative position in which its path of motion brings it into engagement with an obstructing member such as one of the set screws 136 when the cross-slide is moved. The stop element 140 is shown in operative position in Figure 3, the stop element 141 being shown in its inoperative position. The spool is adapted to yield axially a definite limited distance when one of its set screws is engaged by a stop element travelling with the cross-slide. When the spool reaches the limit of its permitted movement it positively blocks the cross-slide against any further travel. The displacement of the spool by the stop member results in the disengaging of the feed mechanism of the cross-slide from its driving means. The several set screws 136 may be adjusted as desired to stop the feed of the cross-slide at different predetermined points, these points being determined by the selection of a suitably adjusted set screw 136. As shown in Figure 5, the spool 135 is releasably held in a definite angular position as by a yielding detent consisting of a ball 143 pressed by a spring 144 in a suitable recess 145 in the side of the spool. Thus the spool may be correctly but releasably held in any one of four positions, according to the particular set screw 136 selected for engagement with the stop elements 140 and 141. It is evident that when the cross-slide 55 is being fed, one or the other of the stop elements 140 and 141 will eventually engage a set screw 136, if the stop elements are in operative position, this engagement resulting in axial displacement of the spool 135 so as to rock the bell crank 130 and thus to release the control lever 75. This throws out the clutch and stops further feeding movement of the cross-slide, Somewhat similar mechanism is provided for knocking off the feed of the carriage along the bed frame of the lathe. Such mechanism may include a spool 160 having a number of set screws 161 adjustably set therein to engage a suitable stop (not shown) on the lathe bed. As indicated in Figure 2, axial displacement of the spool 160 rocks a lever 165 which is pivotally mounted as at 166, this lever having an extension 167 presented against a plunger 170 to release a control lever 175 in a manner similar to that herein-before described. The plunger 170 is provided with a head 171 which is adapted to engage the inner end of the thimble in which the plunger slides. This definitely and positively limits the rocking of the lever 165 and hence furnishes a positive stop for the feeding movement of the carriage. The lever 175 may be constructed and operated identically with the construction and operation of the control lever 75.

Both of the feed knock-off control levers, as indicated in Figure 5, are preferably mounted in a substantially horizontal position so that when released, they will descend by their own weight to throw out the corresponding clutches. Each lever may be provided with a suitable handle 180 at its free end to facilitate manual operation. To support the auxiliary lever 110 in its normal position relative to the lever 75, a plunger 181 may be arranged in the lever 75 to press against a shoulder 182 on the lever 110, a suitable spring 183 being behind the plunger.

An embodiment of the invention having thus been described, it is to be understood that the invention is not to be limited to the specific form shown, but may be varied within the scope of the following claims.

What I claim is:

1. In a lathe, a bed, a carriage slidable thereon, a cross-slide slidable on said carriage transversely of said bed, means for feeding said slide, a power-driven shaft, means for connecting said feeding means to said shaft, a pair of stop elements mounted on said slide, and means on said carriage engageable by either of said stop elements to disconnect said feeding means from said shaft, said last-mentioned means including a device releasable to disconnect said feeding means, a shouldered plunger longitudinally movable to release said device, a non-yielding member engageable by the shoulder on said plunger simultaneously with the release of said device, an abutment member adapted to engage either of said stop elements, and non-yielding connections between said abutment member and said plunger.

2. In a lathe, a bed, a carriage slidable thereon, a cross-slide on said carriage, means on said carriage for feeding said cross-slide including a power-driven shaft, a feed-screw, and mechanism operatively connecting said shaft and feed-screw, and means for automatically and simultaneously disconnecting said feed-screw from said shaft when the slide reaches a predetermined point and positively stopping said slide at said point, said disconnecting means including a device releasable to disconnect said feeding means, a plunger movable a predetermined limited distance just sufficient to release said device, a fixed stop element engageable by said plunger simultaneously with the release of said device, an abutment member mounted on said carriage, a stop element on said cross-slide engageable by said abutment member, and non-yielding step-up connecting mechanism operably connecting said abutment member with said plunger, whereby any movement of said abutment member results in a multiplied distance of movement of said plunger.

3. In a lathe having a bed, a carriage thereon, a cross-slide on said carriage, and feeding means for said cross-slide, mechanism for automatically knocking off the cross-slide feed, said mechanism including a lever rockable to knock off the feed, a latch on said lever normally holding said lever in inoperative position, a plunger movable against the latch to release said lever, a positive stop member engageable by said plunger coincidentally with the release of the lever, and means for moving said plunger, said last mentioned means including a pair of stop elements on said slide, an obstructing member mounted on the carriage in the path of motion of said elements and movable thereon by contact with either of said stop elements, and motion-multiplying means operatively connecting said obstructing member and plunger whereby movement of said obstructing member results in materially greater movement of said plunger.

4. In a lathe having a bed, a carriage thereon, and feeding means for said carriage, mechanism for automatically knocking off said feed means, said mechanism including a lever rockable to knock off the feed, a latch on said lever normally holding said lever in inoperative position, means for moving said latch to release said lever when the carriage reaches a predetermined point and to positively stop said carriage at said point, said latch-moving and carriage-stopping means including a plunger movable against said latch and having a shoulder, a stop element engageable by said shoulder to stop said plunger coincidentally with the release of said lever, and a spring pressing said shoulder away from said stop element.

5. In a lathe having a bed and a carriage movable thereon, feed means for said carriage, feed knock-off mechanism including a lever releasable to knock off the feed, a stop element adjustably fixed on said bed, a spool carried by said carriage and movable therewith into contact with said stop element, said spool being movable relatively to the carriage, a bell crank mounted on said carriage and rockable by relative movement of the spool, a shouldered plunger movable by rocking of said bell crank to release said lever, a fixed shoulder on the carriage engageable by said plunger to stop movement of the plunger coincidentally with the release of the lever, and a spring pressing the plunger away from said fixed shoulder.

6. In a lathe having a cross slide and feed means therefor, mechanism for knocking off said feed at predetermined points, said mechanism including a lever releasable to knock off the feed, a latch normally holding said lever in inoperative position, a shouldered plunger movable to release said latch, a fixed shoulder engageable by said plunger to stop the movement of the plunger coincidentally with the release of the latch, a spring pressing said plunger away from said shoulder, a bell crank rockable in either direction from an intermediate position to move said plunger against said spring to latch-releasing position, a spool carried by said cross slide and movable in opposite directions to rock said bell crank, and adjustable fixed stops engageable by said spool for latch-releasing movement when the cross slide reaches predetermined points in its travel.

JOHN E. LOVELY.